(12) United States Patent
Yamazaki et al.

(10) Patent No.: US 8,528,588 B2
(45) Date of Patent: Sep. 10, 2013

(54) SAFETY VALVE DRIVE SYSTEM (75) Inventors: Hiroshi Yamazaki, Kanagawa-ken (JP); Takeo Shimizu, Kanagawa-ken (JP); Yuka Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 849 days.

(21) Appl. No.: 12/665,277

(22) PCT Filed: Jun. 17, 2008

(86) PCT No.: PCT/JP2008/061054
§ 371 (c)(1),
(2), (4) Date: Dec. 17, 2009

(87) PCT Pub. No.: WO2008/156086
PCT Pub. Date: Dec. 24, 2008

(65) Prior Publication Data
US 2010/0181508 A1 Jul. 22, 2010

(30) Foreign Application Priority Data
Jun. 18, 2007 (JP) ................................. 2007-160760

(51) Int. Cl.
*F16K 17/00* (2006.01)
*F16K 31/12* (2006.01)
*G21C 9/00* (2006.01)

(52) U.S. Cl.
USPC ........................... 137/467; 137/488; 376/283

(58) Field of Classification Search
USPC ................. 137/488, 492.5, 467; 376/20, 21, 376/283
See application file for complete search history.

(56) References Cited

U.S. PATENT DOCUMENTS

| 4,129,141 | A | * | 12/1978 | Vogeli | 137/462 |
| 5,341,837 | A | * | 8/1994 | Johnson | 137/458 |
| 5,590,684 | A | * | 1/1997 | Alberts et al. | 137/489 |
| 6,061,412 | A | * | 5/2000 | Stucker et al. | 376/217 |
| 6,220,280 | B1 | * | 4/2001 | Lai | 137/488 |
| 6,550,018 | B1 | * | 4/2003 | Abonamah et al. | 714/6.32 |

FOREIGN PATENT DOCUMENTS

| JP | 60-166892 A | 8/1985 |
| JP | 63-003295 A | 1/1988 |
| JP | 5-080191 A | 4/1993 |
| JP | 8-233990 A | 9/1996 |
| JP | 9-304584 A | 11/1997 |
| JP | 10-186087 A | 7/1998 |
| JP | 11-295481 A | 10/1999 |

* cited by examiner

*Primary Examiner* — Stephen M Hepperle
*Assistant Examiner* — Kevin Barss
(74) *Attorney, Agent, or Firm* — Foley & Lardner LLP (57) ABSTRACT

A safety valve drive system is operated such that a safety valve of a nuclear power plant is opened by supplying a driving gas by using a pilot valve at an occurrence of an accident or a transient state to thereby protect a reactor against pressure application. The safety valve drive system is provided with a safety valve drive unit, as a function of actuating the safety valve, and cables. The safety valve drive unit actuates in a manner that the safety valve is opened in response to respective auto-depressurization system actuating signals for two or more segments among respective auto-depressurization system actuating signals for four segments, and is closed if an auto-depressurization system actuating signal for one or less segment among the auto-depressurization system actuating signals for the four segments is received. The cables are connected to the safety valve drive unit and used to transfer the auto-depressurization system actuating signals for the four segments.

6 Claims, 7 Drawing Sheets

SAFETY VALVE DRIVE SYSTEM

TECHNICAL FIELD

The present invention relates to a safety valve drive system of a nuclear power plant, and particularly, to a drive system for an safety relief valve provided in a main steam system of a nuclear power plant to protect a reactor from applying pressure by opening the safety relief valve through the supply of a driving gas using a pilot valve if an accident or a transient state occurs.

BACKGROUND ART

Safety relief valves provided for boiling-water reactor power plants and other types of nuclear power plants are equipments having steam relieving functions and safety functions and constituting a main steam system. The main steam system is comprised of a main steam pipeline, a safety relief valve, a steam flow restrictor, a main steam isolation valve, a main steam pipe drain system, and a feed water system. The functions of the main steam system include a steam supply from a reactor pressure vessel to a turbine, a pressure suppression of the reactor pressure vessel within a limit value in a transient state of a reactor, and steam releasing restriction from the reactor pressure vessel and a reactor containment vessel.

The main steam system generally includes four main steam pipes for introducing steam generated within the reactor pressure vessel to the turbine. A plurality of safety valves is provided for each main steam pipe. Safety valves are provided for a main steam pipe in order to suppress reactor pressure to a value less than a specified value if, for some reason, an accident or the like occurs in the reactor or in the vicinity thereof. A safety valve has spring-operated safety functions and relief valve functions for forcibly opening the safety valve by an auxiliary actuator at a set pressure less than a blowout pressure.

As the relief valve functions, the safety valve releases steam in the reactor pressure vessel to a pressure suppression pool by means of forced manual opening or automatic opening in response to a high relief valve pressure. Some safety valves are built in an auto-depressurization system to be enabled in case of a loss-of-coolant accident (LOCA). The safety valves are automatically forced to open by means of remote operation based on a high reactor containment vessel pressure signal or a low reactor water level signal, thereby depressurizing the reactor pressure vessel until cooling water injection by a low-pressure emergency core cooling system becomes possible.

Conventional technology will be described hereunder with reference to FIGS. 4 to 7.

Figure 4:
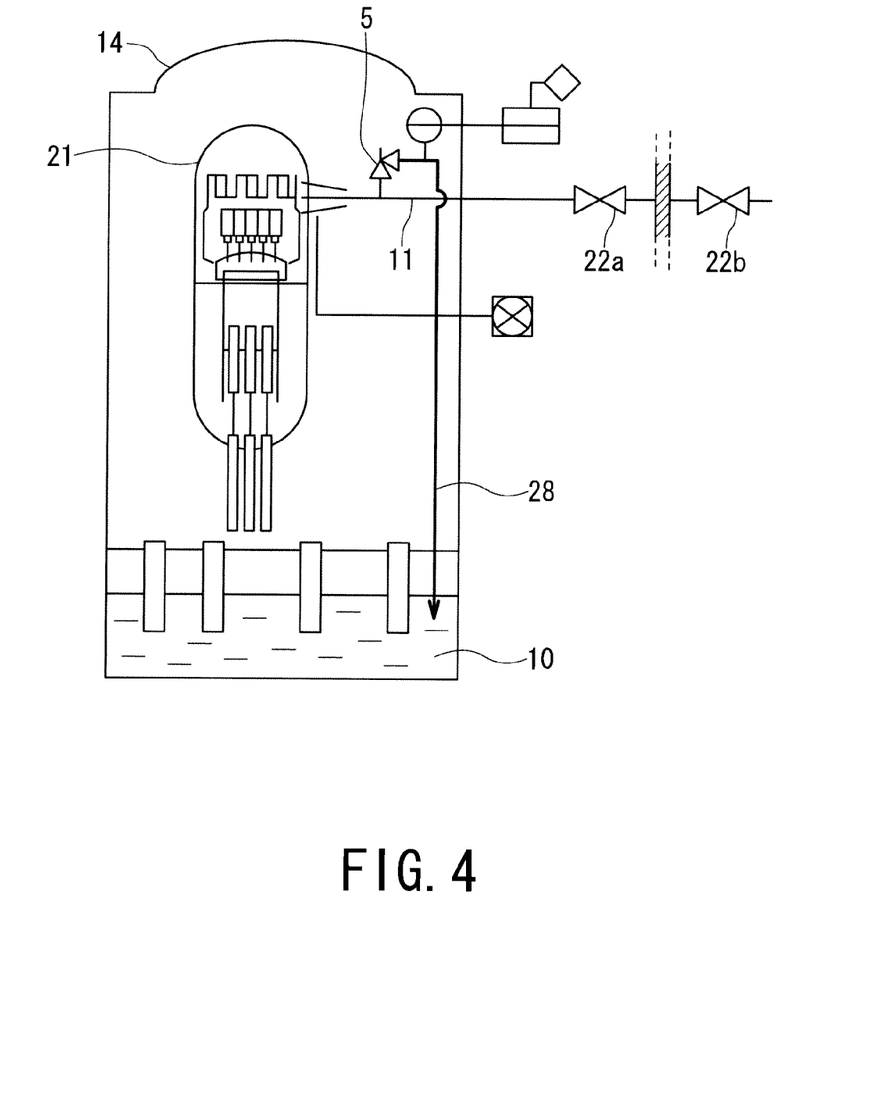
FIG. 4 is a configuration diagram illustrating an example of a conventional reactor containment vessel.
Figure 5:
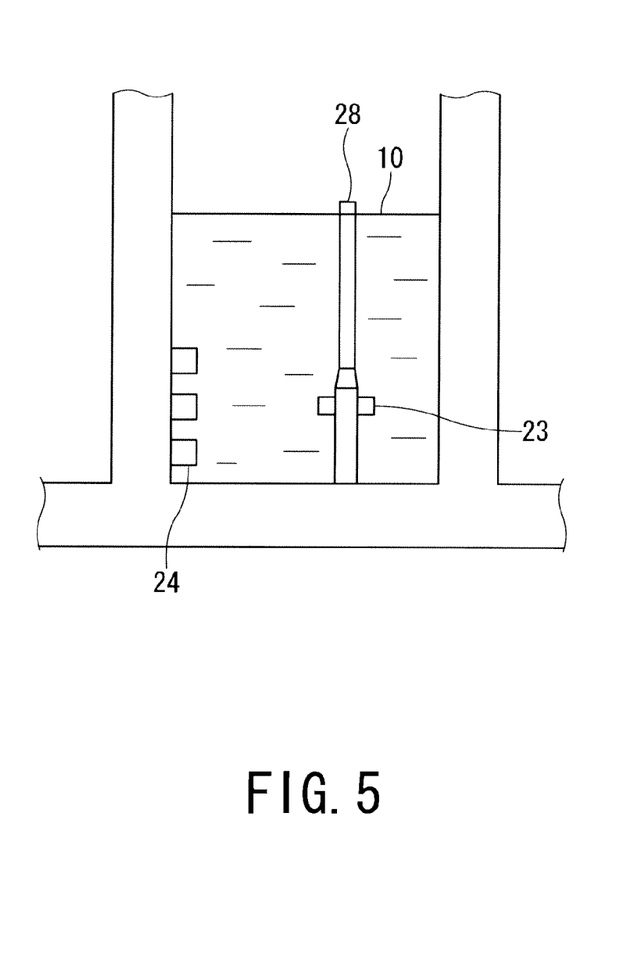
FIG. 5 is a configuration diagram illustrating an example of a conventional pressure suppression chamber.

FIG. 4 illustrates a reactor containment vessel of a boiling-water nuclear power plant, and FIG. 5 is an enlarged view of a pressure suppression pool illustrated in FIG. 4. As illustrated in FIGS. 4 and 5, a reactor pressure vessel 21 is installed within a reactor containment vessel 14, and a safety valve 5 is provided in a pipe of a main steam system 11. In the safety valve 5, there is provided a safety valve exhaust pipe 28 for introducing steam to a pressure suppression pool 10. Vent pipes 24 are provided in a wall of the pool, and a quencher 23 for facilitating steam condensation in the pressure suppression pool 10 is connected to the lower end of the safety valve exhaust pipe 28. Note that in FIG. 4, reference numerals 22a and 22b denote main steam isolation valves.

Figure 6:
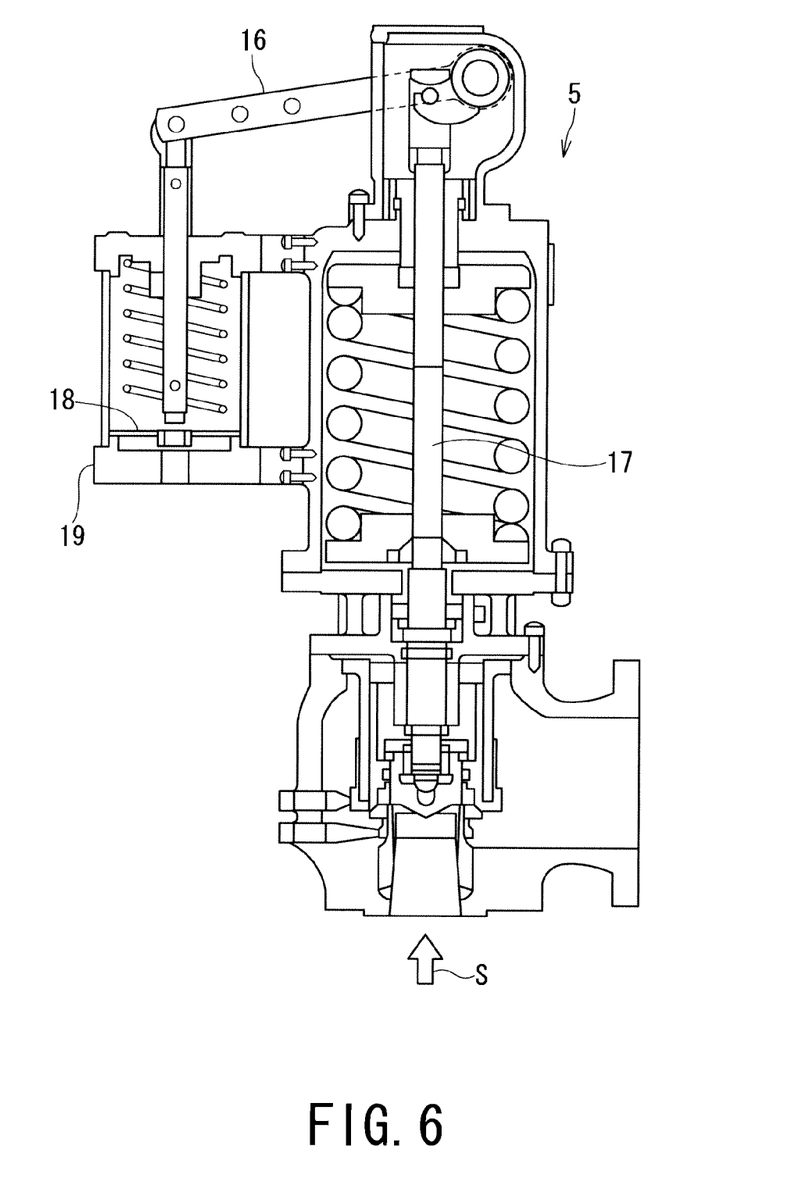
FIG. 6 is a configuration diagram illustrating an example of a conventional safety valve exhaust pipe.
Figure 7:
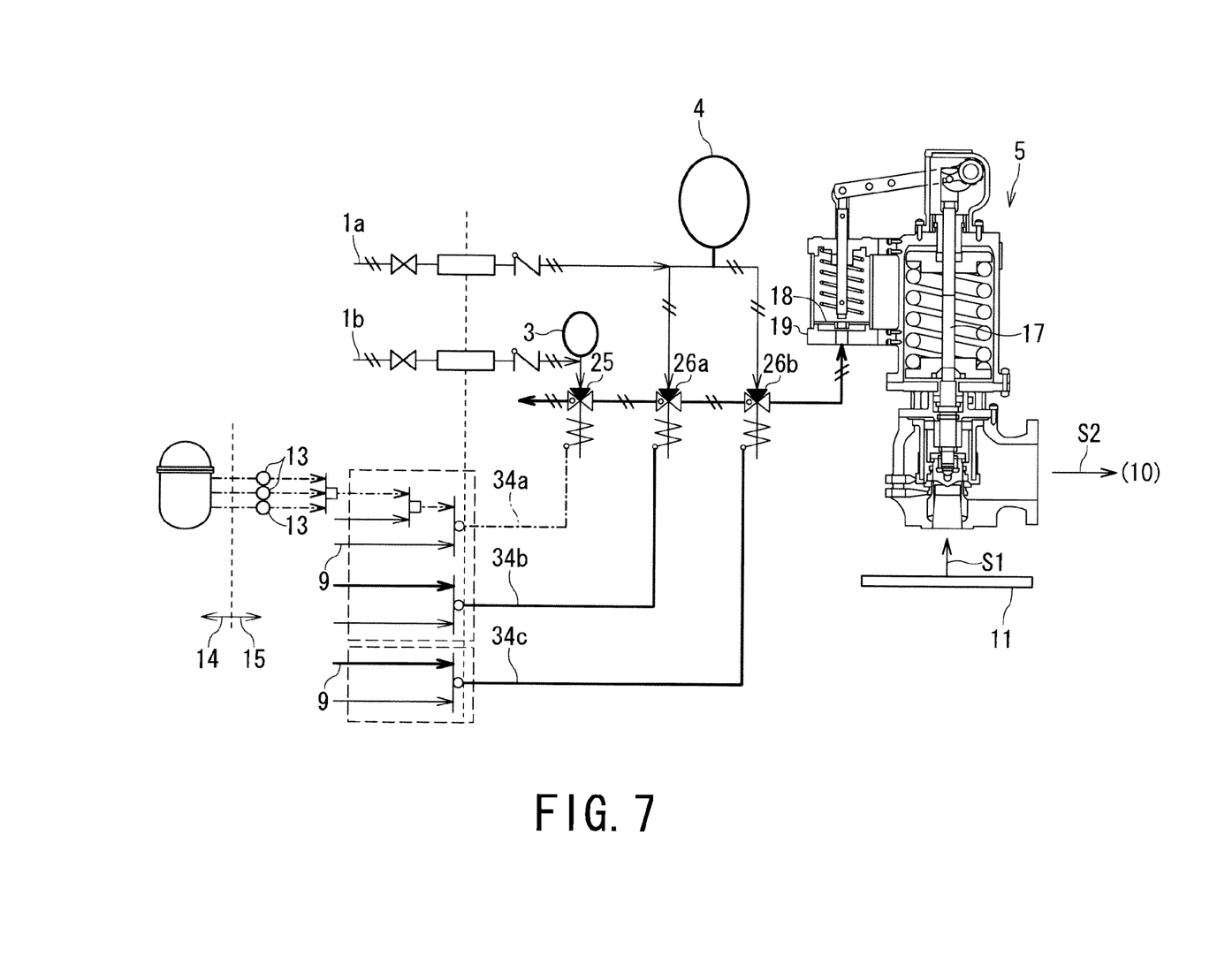
FIG. 7 is a configuration diagram illustrating the operating logic of a safety valve employed in a conventional advanced boiling-water reactor.

FIG. 6 illustrates the configuration of a safety valve and FIG. 7 illustrates a safety valve drive system. As illustrated in FIGS. 6 and 7, accumulators 3 and 4 are provided conventionally to supply an operating gas from a high-pressure nitrogen gas supply system 1 (1a, 1b), in order to open the safety valve 5 if an accident or a transient state occurs. The safety valve 5 is a nitrogen- and spring-operated type and is mounted on a pipe stand provided for the main steam pipe of the reactor containment vessel. An outlet side of the valve is formed as a flange connected to an exhaust pipe. The safety valve 5 is designed to automatically open (safety functions) if a valve inlet pressure exceeds a spring load. A piston 18 disposed in an air cylinder 19 mounted on the valve main unit and a valve shaft 17 are coupled with each other by means of a pull-up lever 16. Thus, the valve is configured so as to be opened (relief valve functions) by supplying nitrogen into the air cylinder 19 using an external signal. Supply of nitrogen into the air cylinder 19 is performed by operating a controlling solenoid valve.

Next, an operating logic of the safety valve 5 will be explained. As illustrated in FIG. 7, the safety valve 5 operates, in response to a simultaneous signal of a reactor water level "low" and a dry well pressure "high", as the result of an auto-depressurization system actuating signal 9 being generated with an emergency core system pump enabled. If one of two solenoid valves for auto-depressurization functions 26a and 26b is opened in response to logic circuit output signals from the output signal cables 34b and 34c of logic circuits, a nitrogen gas is supplied from a high-pressure nitrogen gas supply system 1 or an accumulator 4, thereby forcing the safety valve 5 to open. Consequently, steam flows from the main steam system 11, in a direction shown by arrows S1 and S2, into the pressure suppression pool 10, thereby depressurizing the reactor pressure vessel.

On the other hand, if the pressure of a reactor rises and a high relief valve pressure signal is generated by a pressure gauge 13 for relief valve functions, a signal for relief valve functions is generated through an output signal cable 34a of a logic circuit, thereby causing the safety valve 5 to operate. If one solenoid valve 25 having relief valve functions opens in response to an output signal of a logic circuit, a nitrogen gas is supplied from the high-pressure nitrogen gas supply system 1 or an accumulator 3, thereby forcing the safety valve 5 to open. Consequently, steam flows into the pressure suppression pool 10 in the same way as described above, thereby depressurizing the reactor pressure vessel.

Further, in the figure, reference numeral 14 denotes a reactor containment vessel side and reference numeral 15 denotes a reactor building side. In addition, examples of conventional proposals of such a safety valve drive system described above include one described in Patent Document 1 (Japanese Patent Laid-Open No. 9-304584).

As described above, the operating logic of a safety valve works in the manner that if at least one of three three-way solenoid valves operates, the safety valve is forced to open, thereby depressurizing the reactor pressure vessel. In addition, according to the current operating logic of a driving solenoid valve, there is a possibility that if a fire occurs, a cable short-circuits to another cable and a false signal is generated, thus causing the solenoid valve to open mistakenly. Moreover, if the safety valve opens due to the malfunction of the solenoid valve, the depressurization of the reactor pressure vessel or the outflow of reactor water occurs, thus causing the water level of a reactor to drop. In addition, it is conceivable that in current systems of safety valves, online maintenance becomes difficult to perform if a power source for driving an auto-depressurization system is lost.

DISCLOSURE OF THE INVENTION

The present invention has been accomplished in view of such problems as described above, and an object thereof is to provide a system or facility capable of improving the operating logic of a safety valve, enhancing the reliability thereof, and making compatible with online maintenance in order to eliminate the possibility of occurrence of a loss-of-coolant accident caused by the malfunction of a solenoid valve resulting from cable short-circuiting due to a fire or the like.

In order to achieve the above-mentioned object, the present invention provides a safety valve drive system in which a safety valve provided in a main steam system of a nuclear power plant is opened by supplying a driving gas by using a pilot valve at an occurrence of an accident or a transient state occurs, thereby protecting a reactor against pressure application, the safety valve drive system comprising: a safety valve drive unit, as safety valve actuating means, actuating in such a manner that the safety valve is opened in response to respective auto-depressurization system actuating signals for two or more segments among respective auto-depressurization system actuating signals for four segments, and is closed if an auto-depressurization system actuating signal for one or less segment among the auto-depressurization system actuating signals for the four segments is received; and cables connected to the safety valve drive unit and used to transfer the auto-depressurization system actuating signals for the four segments.

In addition, there is also provided a safety valve drive system which comprises: a safety valve drive unit, as safety valve actuating means, actuating in such a manner that the safety valve is opened in response to respective relief valve actuating signals for two or more segments among respective relief valve actuating signals for three segments, and is closed if an auto-depressurization system actuating signal for one or less segment among the auto-depressurization system actuating signals for three segments is received; and cables connected to the safety valve drive unit and used to transfer the auto-depressurization system actuating signals for the three segments.

Further, in the above-described safety valve drive system, the phrase "relief valve actuating signal" may alternatively be read as "auto-depressurization system actuating signal," depending on a reactor type different in the configuration of a safety system.

According to a safety valve drive system of the present invention of the characters mentioned above, it is possible to eliminate the possibility of occurrence of a loss-of-coolant accident caused by the malfunction of a solenoid valve resulting from cable short-circuiting due to a fire or the like, thereby improving the safety valve in the operating logic thereof, enhancing the reliability thereof, and making compatible with online maintenance.

BEST MODE FOR CARRYING OUT THE INVENTION

Hereinafter, embodiments of the present invention will be described with reference to FIGS. 1 to 3. It is further to be noted that although, in described embodiments, an explanation will be made of a case in which the present invention is applied to a boiling-water reactor, the present invention is also applicable to nuclear power plants other than a boiling-water reactor.

First Embodiment

FIG. 1

Figure 1:
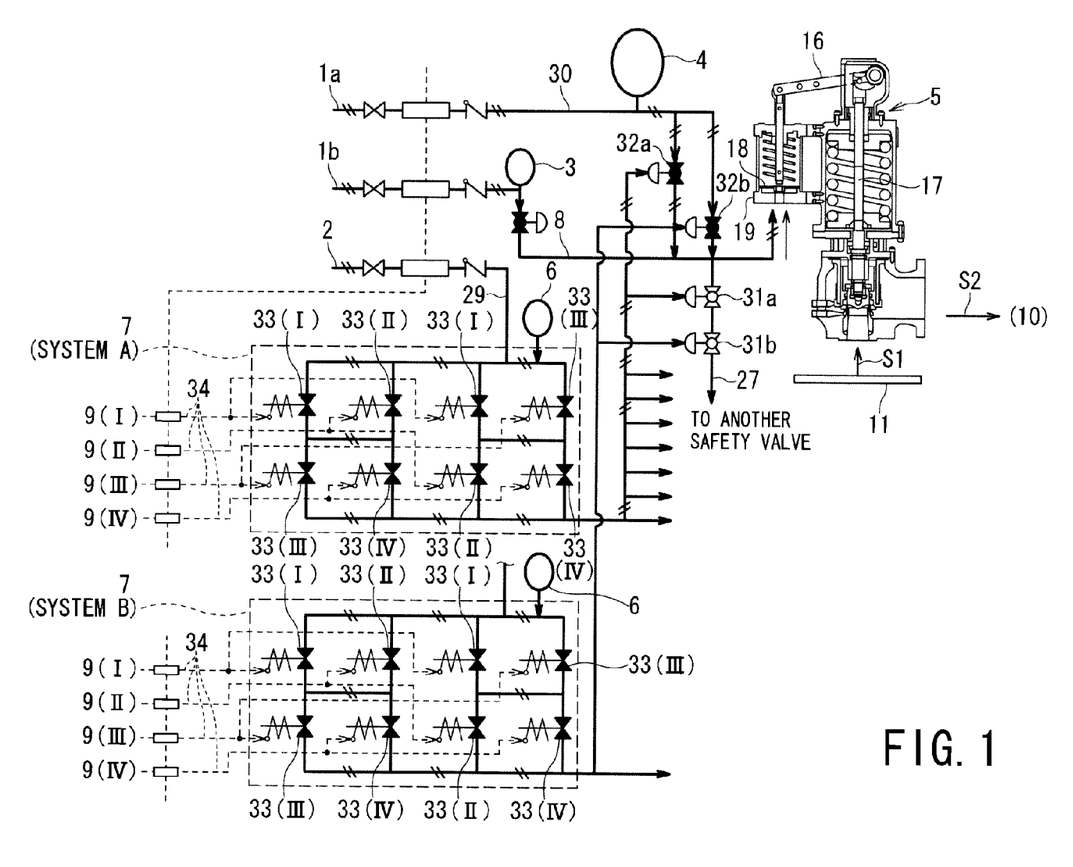
FIG. 1 is a system configuration diagram illustrating a first embodiment of the present invention.

FIG. 1 is a configuration diagram illustrating a safety valve drive system according to a first embodiment of the present invention. In the present embodiment, hereunder, an operating logic of auto-depressurization functions of a safety valve, installation of an opening line, enhancement of the operating logic of the auto-depressurization functions of the safety valve, a change of a driving source of the safety valve, a method of storing the driving source, and the like will be explained.

As illustrated in FIG. 1, in the present embodiment, two systems, a system A and a system B, are provided as drive circuits for auto-depressurization functions 7 of a safety valve 5. These system-A and system-B drive circuits for auto-depressurization functions 7 are comprised of circuits based on auto-depressurization system actuating signals 33 (33(I), 33(II), 33(III) and 33(IV)) of four segments. The respective segments are composed so as to be physically and electrically independent of one another. Each drive circuit for auto-depressurization functions 7, to which actuating signals 9 (9(I), 9(II), 9(III) and 9(IV)) of an auto-depressurization system are input, has multiplicity and electrical and physical independency. Thus, each drive circuit for auto-depressurization functions 7 is configured so that the functions thereof are not hampered even by a single failure of equipment or by the online maintenance of a power supply system.

As described above, the safety valve drive system is configured so that a safety valve provided in a main steam system of a nuclear power plant is opened by supplying a driving gas using a pilot valve if an accident or a transient state occurs, thereby protecting a reactor against excessive pressure.

In addition, as means for actuating the safety valve, the safety valve drive system includes a safety valve drive unit which operates in a state that the safety valve is opened in response to respective auto-depressurization system actuating signals for two or more segments among respective auto-depressurization system actuating signals 9 (9(I), 9(II), 9(III) and 9(IV)) for the four segments, and is closed in a state for an actuating signal for one or less segment among the auto-depressurization system actuating signals 9 for the four segments, and the safety valve drive system further includes cables 34 connected to this safety valve drive unit so as to transfer the auto-depressurization system actuating signals for the four segments.

Further, FIG. 1 shows safety valve driving gas supply systems 1a and 1b and a pilot valve driving gas supply system 2. In addition, accumulators for the auto-depressurization functions 4, 3 and 6, and the pilot valves (opening lines) 31a and 31b, and the pilot valves (for safety valve driving) 3a and 3b are provided in gas supply lines for the auto-depressurization functions 30, 8 and 29, respectively.

In such a configuration as described above, the pilot valves (for safety valve driving) 32 (32a and 32b) for performing the opening/closing drive of the safety valve 5 are mounted on the driving gas supply line 30 of the safety valve. The pilot valves 32 open when supplied with a pilot valve driving gas, and a piston 18 and a valve shaft 17 within an air cylinder 19 of the safety valve are pulled up, thereby causing the safety valve 5 to open. If not supplied with the pilot valve driving gas, the pilot valves (for safety valve driving) 32 (32a, 32b) are closed and the safety valve 5 is also closed.

Each drive circuit for the auto-depressurization functions 7 is comprised of eight solenoid valves 33 and is installed on a pilot valve driving gas supply line 29. The drive circuit supplies a gas from a gas supply system (for pilot valve driving) 2, in order to drive the pilot valve (for safety valve driving) 32. This configuration of the solenoid valves 33 is based on a so-called "2-out-of-4" logic. That is, the pilot valve driving gas is supplied to the pilot valve (for safety valve driving) 32 in response to the respective auto-depressurization system actuating signals for two or more segments among the auto-depressurization system actuating signals 9 for the four segments, and the safety valve 5 opens. In contrast, the pilot valve driving gas is not supplied to the pilot valve (for safety valve driving) 32 if an actuating signal for one or less segment among the auto-depressurization system actuating signals 9 for the four segments is received, and the safety valve 5 is closed.

The operating logic of the safety valve 5 is made compatible with online maintenance with respect to a power supply and a signal for each safety system segment by setting the logic circuit for actuating the auto-depressurization functions of the safety valve 5 to a "2-out-of-4" logic. Thus, the reliability of the operating logic is improved.

In addition, it is possible to reduce the possibility for the safety valve to malfunction due to a false signal generated as the result of a short circuit between cables at the time of fire. Furthermore, an improvement is made to reliability against the possible malfunction of a safety system at the time of online maintenance.

As described above, in the present embodiment, the safety valve drive unit is provided with the pilot valve 31 mounted on the driving gas supply line 30 of the safety valve 5 and adapted to open if supplied with a pilot valve driving gas and to close if not supplied with the pilot valve driving gas, and also provided with the pilot valve driving gas supply line for driving this pilot valve.

In addition, the safety valve drive unit includes the pilot valve driving circuit arranged in the pilot valve driving gas supply line, so that a pilot valve driving gas is supplied to the pilot valve in response to the respective auto-depressurization system actuating signals for two or more segments among the auto-depressurization system actuating signals 9 for the four segments, and on the other hand, the pilot valve driving gas is not supplied to the pilot valve if an actuating signal for one or less segment among the auto-depressurization system actuating signals 9 for the four segments is received.

In order to prevent the safety valve 5 from opening mistakenly due to a small amount of gas leakage from the eight normally-"closed" solenoid valves 33 or the safety valve driving pilot valve (for safety valve driving) 32, an always-"open" opening line 27 and an always-"open" pilot valve (opening line) 31 are provided, so that the pilot valve is closed if the pilot valve driving gas is supplied to thereby open the safety valve 5.

That is, in the present embodiment, the safety valve drive unit comprises: an opening line provided on a gas supply line for the safety valve opening operation; a pilot valve provided on the opening line, so as to close if a pilot valve driving gas is supplied and open if the pilot valve driving gas is not supplied; a pilot valve driving gas supply line for driving the pilot valve; and a pilot valve driving circuit provided on the pilot valve driving gas supply line so as to operate in a manner such that the pilot valve driving gas is supplied to the pilot valve in response to the respective actuating signals for two or more segments among the actuating signals for the four segments, and the pilot valve driving gas is not supplied to the pilot valve if an actuating signal for one or less segment among the actuating signals for the four segments is received.

If the pilot valve (for safety valve driving) 32 and the pilot valve (opening line) 31 do not operate due to malfunction, the auto-depressurization system as a whole may fail to operate. Accordingly, it is possible to make this configuration as duplex structure. The present embodiment in this case is configured in the manner as illustrated in FIG. 1, the pilot valves (for safety valve driving) 32 are arranged in parallel and the pilot valves (opening line) 31 are arranged in series, so that the safety valve 5 can be driven if either one of the two valves operates.

As described above, in the present embodiment, two pilot valves on the opening line are arranged in series and two safety valve driving pilot valves are arranged in parallel, thereby providing safety valve drive units having duplex structure in preparation for the case that the safety valve drive unit fails to operate due to the malfunction of the pilot valve.

In addition, a gas accumulator 6 is arranged so that gas can be stably supplied for a certain period of time even if the functions of the gas supply system (for pilot valve driving) 2 for supplying a gas to the pilot valve driving gas supply line 29 are lost.

That is, in the present embodiment, a safety valve drive system is installed such that an accumulator is disposed in a pilot valve driving gas supply line in preparation for loss in the functions of a pilot valve driving gas supply system.

According to the present embodiment, it is possible to eliminate the possibility of occurrence of a loss-of-coolant accident caused by the malfunction of a solenoid valve resulting from cable short-circuiting due to a fire or the like. Therefore, the safety valve can be improved in the operating logic thereof, enhanced in the reliability thereof, and made satisfactorily compatible with online maintenance.

Second Embodiment

FIG. 2

Figure 2:
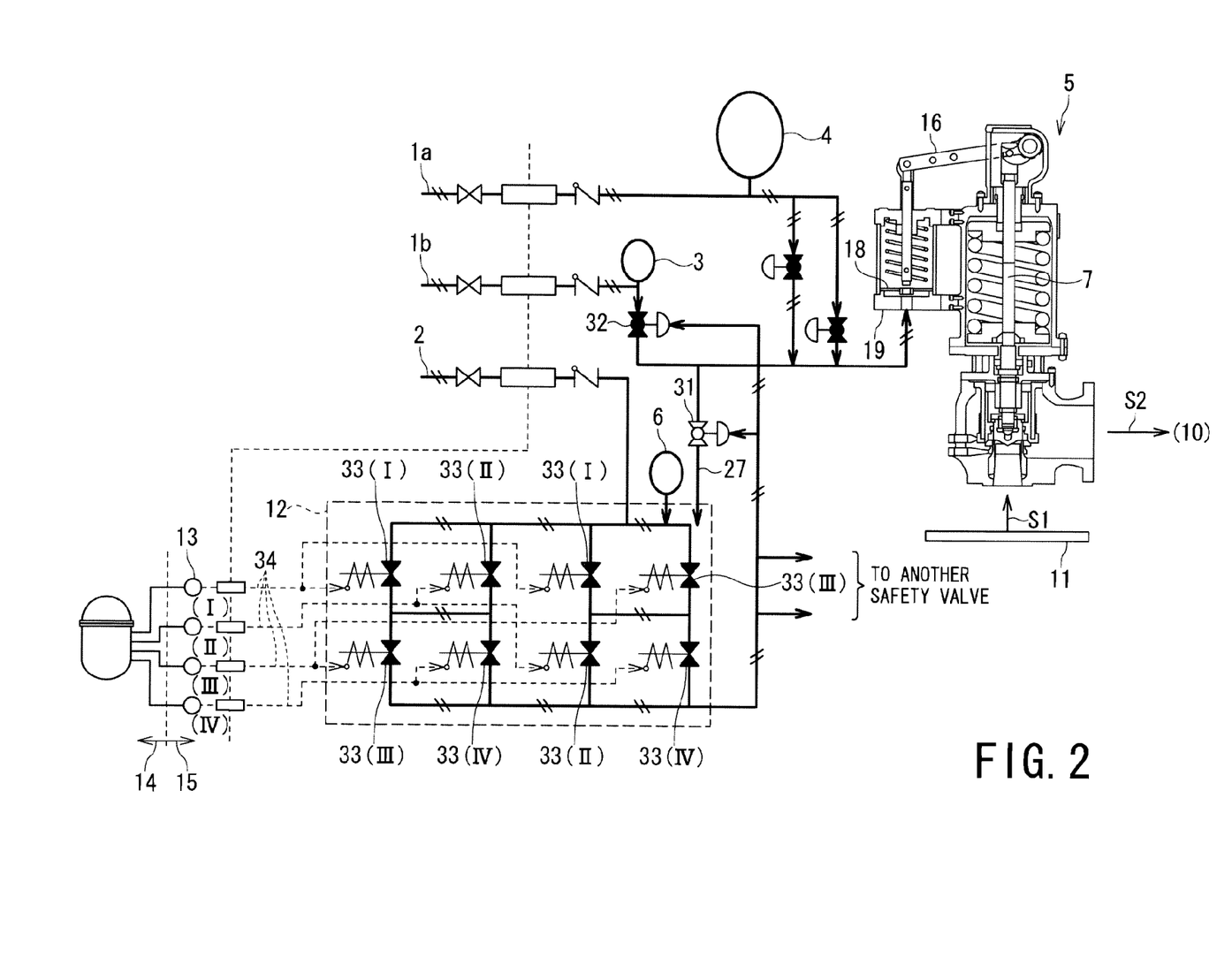
FIG. 2 is a system configuration diagram illustrating a second embodiment of the present invention.

FIG. 2 is a configuration diagram illustrating a safety valve drive system according to a second embodiment of the present invention, in which like reference numerals are added to elements or members corresponding to those of the first embodiment mentioned above with reference to FIG. 1, and duplicated explanations thereof are omitted hereunder.

As illustrated in FIG. 2, in the present embodiment, an explanation will be made of the operating logic of the relief valve functions of a safety valve, the installation of an opening line, the change of the driving source of the safety valve, and a method of storing the driving source.

A drive circuit 12 for relief valve functions of a safety valve 5 includes generation of actuating signals for relief valve functions 13 composed of four segments and the circuits thereof, in which the respective segments have structures each physically and electrically independent of one another.

Consequently, the drive circuit has multiplicity and electrical and physical independency, so that the functions of the drive circuit are not hampered even by an occurrence of a single failure of equipment or by the online maintenance of a power supply system.

The present embodiment is a safety valve drive system in which a safety valve provided in the main steam system of a nuclear power plant is opened by supplying a driving gas by a pilot valve if an accident or a transient state occurs, thereby protecting a reactor against pressure application.

In addition, as means for actuating the safety valve, the safety valve drive system comprises: a safety valve drive unit actuating the safety valve to be opened in response to respective relief valve pressure setpoint "high" actuating signals for two or more segments among respective relief valve pressure setpoint "high" actuating signals for the four segments, and to be placed in a closed state if an actuating signal for one or less segment among the relief valve pressure setpoint "high" actuating signals for the four segments is received; and cables connected to the safety valve drive unit and used to transfer the relief valve pressure setpoint "high" actuating signals for the four segments.

It is to be noted that according to such a configuration as described above, it is possible to eliminate the possibility of occurrence of a loss-of-coolant accident caused by the malfunction of a solenoid valve resulting from cable short-circuiting due to a fire or the like, in the same way as in the first embodiment, whereby the safety valve can be improved in the operating logic thereof, enhanced in the reliability thereof, and made compatible with online maintenance. Accordingly, it is possible to shorten the shutdown period of a reactor in a nuclear power plant due to periodical inspection.

Third Embodiment

FIG. 3

Figure 3:
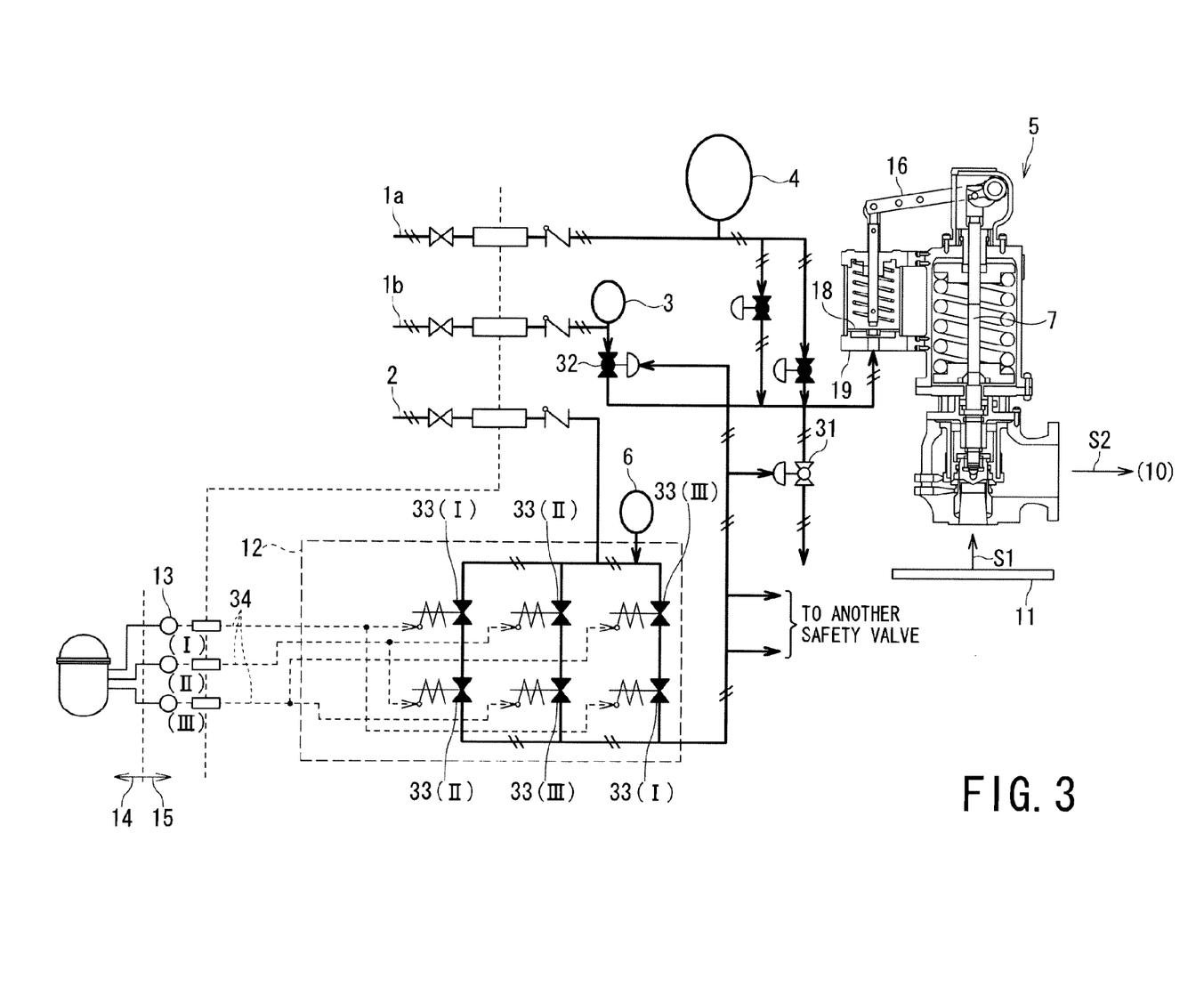
FIG. 3 is a system configuration diagram illustrating a third embodiment of the present invention.

FIG. 3 is a configuration diagram illustrating a safety valve drive system in accordance with a third embodiment of the present invention, in which like reference numerals are added to elements or members corresponding to those of the first embodiment mentioned above with reference to FIG. 1, and duplicated explanations thereof are omitted hereunder.

As illustrated in FIG. 3, in the present embodiment, an explanation will be made to the operating logic of the relief valve functions of a safety valve, the arrangement of an opening line, the change of the driving source of the safety valve, and a method of storing the driving source is also explained.

A drive circuit 12 for relief valve functions of a safety valve 5 includes actuating signals 13 for relief valve functions composed of three segments and the circuits thereof, in which the respective segments have structures physically and electrically independent of one another. Consequently, the drive circuit has multiplicity and electrical and physical independency, so that the functions of the drive circuit are not hampered by a single failure of equipment. Further, this configuration may be also effective for the operating logic of an auto-depressurization system in a plant having a safety system divided into three segments.

The invention claimed is:

1. A safety valve drive system in which a safety valve of a nuclear power plant is opened by supplying a driving gas by using a pilot valve at an occurrence of an accident or a transient state occurs, thereby protecting a reactor against pressure application, the safety valve drive system comprising:
a safety valve drive unit, as the safety valve actuating means, configured to actuate in a manner such that the safety valve is opened in response to respective auto-depressurization system actuating signals for two or more segments among respective auto-depressurization system actuating signals for four segments, and is configured to close by an auto-depressurization system actuating signal for one or less segments among the auto-depressurization system actuating signals for the four segments; and
cables connected up the safety valve drive unit and configured to transfer the auto-depressurization system actuating signals for the four segments;
wherein the safety valve drive unit comprises:
an opening line provided for a gas supply line for safety valve opening operation;
a pilot valve driving gas supply line configured to drive the pilot valve provided for the opening line so as to be closed when a pilot valve driving gas is supplied and to be opened when the pilot valve driving gas is not supplied; and
a pilot valve driving circuit provided for the pilot valve driving gas supply line so as to supply the pilot valve driving gas to the pilot valve in response to respective actuating signals for two or more segments among the actuating signals for four segments, and not to supply the pilot valve driving gas to the pilot valve if an actuating signal for one or less segment among the actuating signals for the four segments is received.

2. The safety valve drive system according to claim 1, further comprising an accumulator provided for the pilot valve driving gas supply line in preparation for loss in functions of a pilot valve driving gas supply system.

3. A safety valve drive system in which a safety valve of a nuclear power plant is opened by supplying a driving gas by using a pilot valve at an occurrence of an accident or a transient state, thereby protecting a reactor against pressure application, the safety valve drive system comprising:
a safety valve drive unit actuating unit, as safety valve actuating means: configured to actuate in such a manner that the safety valve is opened in response to respective relief valve pressure setpoint "high" actuating signals for two or more segments among respective relief valve pressure setpoint "high" actuating signals for four segments, and is closed state when a relief valve pressure setpoint "high" actuating signal for one or less segments among the relief valve pressure setpoint "high" actuating signals for the four segments is received; and
cables connected to the safety valve drive unit and configured to transfer the relief valve pressure setpoint "high" actuating signals for the four segments;
wherein the safety valve drive unit comprises:
an opening line provided for a gas supply line for safety valve opening operation;
a pilot valve driving gas supply line configured to drive the pilot valve provided for the opening line so as to be closed when a pilot valve driving gas is supplied and to be opened when the pilot valve driving gas is not supplied; and
a pilot valve driving circuit provided for the pilot valve driving gas supply line so as to supply the pilot valve driving gas to the pilot valve in response to respective actuating signals for two or more segments among the actuating signals for four segments, and not to supply the pilot valve driving gas to the pilot valve if an actuating signal for one or less segment among the actuating signals for the four segments is received.

4. The safety valve drive system according to claim 3, wherein an accumulator is provided for in the pilot valve driving gas supply line in preparation for loss in functions of a pilot valve driving gas supply system.

5. A safety valve drive system in which a safety valve of a nuclear power plant is opened by supplying a driving gas by using a pilot valve at an occurrence of an accident or a transient state, thereby protecting a reactor against pressure application, the safety valve drive system comprising:

a safety valve drive unit, as safety valve actuating means, configured to actuate in such a manner that the safety valve is opened in response to respective auto-depressurization system actuating signals for two or more segments among respective auto-depressurization system actuating signals for three segments, and is closed when an auto-depressurization system actuating signal for one or less segments among the auto-depressurization system actuating signals for the three segments is received; and cables connected to the safety valve drive unit and configured to transfer the auto-depressurization system actuating signals for the three segments;

wherein the safety valve drive unit comprises:

an opening line arranged in a gas supply line for safety valve opening operation;

a pilot valve driving gas supply line configured to drive the pilot valve arranged in the opening line so as to be closed when a pilot valve driving gas is supplied and to be opened when the pilot valve driving gas is not supplied; and a pilot valve driving circuit provided for the pilot valve driving gas supply line so as to supply the pilot valve driving gas to the pilot valve in response to respective actuating signals for two or more segments among the actuating signals for the three segments, and not to supply the pilot valve driving gas to the pilot valve if an actuating signal for one or less segment among the actuating signals for the three segments is received.

6. The safety valve drive system according to claim 5, further comprising an accumulator provided for the pilot valve driving gas supply line in preparation for loss in functions of a pilot valve driving gas supply system.

* * * * *